US012560966B2

(12) United States Patent  
Maric et al.

(10) Patent No.: US 12,560,966 B2  
(45) Date of Patent: Feb. 24, 2026

(54) HUB STATION FOR WEARABLE ACCESSORIES

(71) Applicant: APPLE INC., Cupertino, CA (US)

(72) Inventors: Ivan S. Maric, Palo Alto, CA (US); Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/849,106

(22) PCT Filed: Apr. 28, 2023

(86) PCT No.: PCT/US2023/020305
§ 371 (c)(1),
(2) Date: Sep. 20, 2024

(87) PCT Pub. No.: WO2023/219808
PCT Pub. Date: Nov. 16, 2023

(65) Prior Publication Data
US 2025/0199581 A1 Jun. 19, 2025

Related U.S. Application Data

(60) Provisional application No. 63/339,722, filed on May 9, 2022.

(51) Int. Cl.
G06F 1/16 (2006.01)
G06F 3/01 (2006.01)
(52) U.S. Cl.
CPC ............ G06F 1/1632 (2013.01); G06F 1/163 (2013.01); G06F 3/011 (2013.01)

(58) Field of Classification Search
None
See application file for complete search history.

(56) References Cited

U.S. PATENT DOCUMENTS

| | | | |
|---|---|---|---|
| 10,598,960 B2 | 3/2020 | Blum et al. | |
| 2013/0304583 A1* | 11/2013 | Han | H02J 50/12 455/566 |
| 2014/0195180 A1 | 7/2014 | Wojcik et al. | |

(Continued)

OTHER PUBLICATIONS

Satechi, "ST-WMCS3M 3-in-1 Magnetic Wireless Charging Stand User Manual", Dated Jan. 12, 2022, https://manuals.plus/satechi/st-wmcs3m-3-in-1-magnetic-wireless-charging-stand-manual [retrieved on Aug. 10, 2023] (14 pp).

(Continued)

*Primary Examiner* — Aneeta Yodichkas
(74) *Attorney, Agent, or Firm* — Young Basile Hanlon & MacFarlane, P.C.

(57) ABSTRACT

Hub stations for wearable accessories include accessory areas, some accessory areas including receptacles configured to receive and support the wearable accessories. The hub stations include hub indicators associated with respective receptacles or accessory areas. The hub indicators are configured to provide indications designating at least one of user information for, a charge level of, or an availability of a wearable accessory supported by associated receptacles or accessory areas. The hub stations include processors configured to receive notifications for the wearable accessories and send instructions to activate the associated hub indicators based on the notifications.

20 Claims, 7 Drawing Sheets

(56) References Cited

U.S. PATENT DOCUMENTS

| | | | |
|---|---|---|---|
| 2016/0342817 A1* | 11/2016 | Deal ........................ | G06F 21/31 |
| 2017/0346320 A1 | 11/2017 | Jeong et al. | |
| 2018/0063307 A1 | 3/2018 | Hoellwarth | |
| 2019/0124193 A1 | 4/2019 | Kim et al. | |
| 2021/0052755 A1 | 2/2021 | Cruz | |
| 2021/0349529 A1* | 11/2021 | Winold ................ | A61B 5/1124 |

OTHER PUBLICATIONS

Meta Quest, Meta Quest Blog, "Mixed Reality Made Easy, Messenger Calling, Cloud Backup, and More in the Newest Oculus Software Update", Nov. 30, 2021, <www.oculus.com/blog/mixed-reality-made-easy-messenger-calling-cloud-backup-and-more-in-the-newest-oculus-software-update/> (8 pp).
Belkin, "Boost Charge Pro", 3-in-1 Wireless Charger with Official MagSafe Charging 15W, Downloaded Sep. 20, 2024, <https://www.belkin.com/p/3-in-1-wireless-charger-with-official-magsafe-charging-15w/WIZ017ttBK.html#:~:text=This%20is%20my%20favorite%20Belkin%20accessory%2C%20ever!&text=The%20new%20MagSafe%20standard%20charges,from%20ending%20up%20behind%20furniture> (10 pp).

* cited by examiner 200
210a     204a     208     204b     210b
         206a              206b
         214a              214b          202
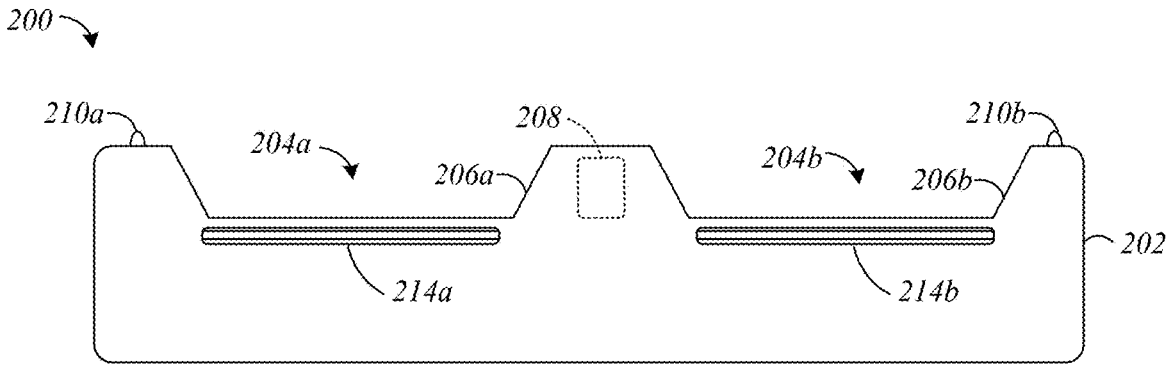
FIG. 2A
200
204c     214c
212a     212b     212c          202
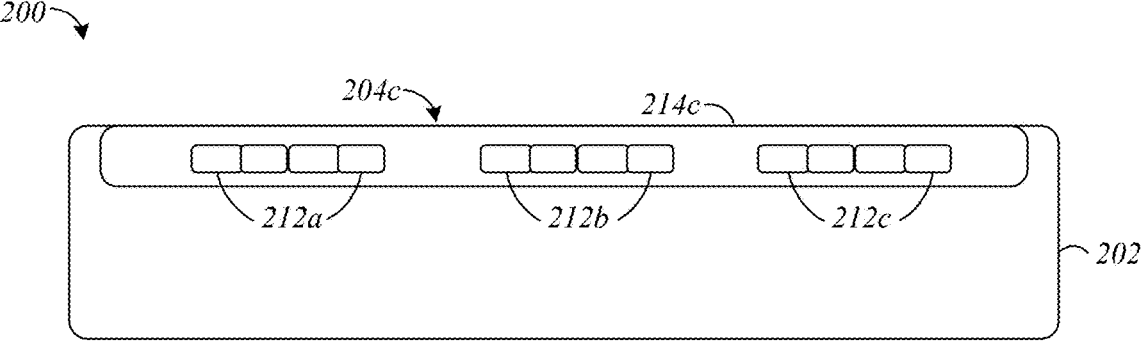
FIG. 2B
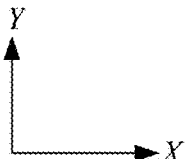

528 — RECEIVE NOTIFICATION FOR WEARABLE ACCESSORY

530 — GENERATE INDICATION BASED ON NOTIFICATION

532 — RECEIVE CONFIGURATION INFORMATION FROM WEARABLE ACCESSORY

534 — GENERATE INDICATION BASED ON CONFIGURATION INFORMATION

HUB STATION FOR WEARABLE ACCESSORIES

CROSS-REFERENCE TO RELATED APPLICATION(S)

This application is a National Stage Application of International Application No. PCT/US2023/020305 filed on Apr. 28, 2023, which claims the benefit of U.S. Provisional Patent Application No. 63/339,722 filed on May 9, 2022, the content of which is hereby incorporated by reference in its entirety for all purposes.

TECHNICAL FIELD

This disclosure relates generally to wearable accessories and specifically to hub stations that organize, support, and communicate with such wearable accessories.

BACKGROUND

Wearable accessories are designed in a variety of shapes and sizes with a variety of features and customizations to support connectivity in physical environments, virtual environments, and co-presence (both real and virtual) environments. Wearable accessories can include head-mounted displays, temple arms or headbands, light seals or face seals, power packs, cords or cables, input devices, headphones, smart watches, and other wearable or holdable devices. Identification, coordination, and organization of personalized versions of such wearable accessories can be complicated by the number, size, and individual capability of various types of wearable accessories.

SUMMARY

A first aspect of the disclosed embodiments is a hub station. The hub station includes a housing with accessory areas, hub indicators associated with at least some of the accessory areas, each hub indicator configured to provide a notification associated with a wearable accessory disposed on a respective accessory area, and registration devices associated with at least some of the accessory areas, each registration device configured to orient a wearable accessory to a respective accessory area.

In the first aspect, the notification can be representative of an incoming communication being received by a head-mounted display useable with a wearable accessory disposed on one of the accessory areas, and the head-mounted display can be spaced from the hub station. At least some of the hub indicators can be configured to provide an indication designating at least one of user information for, a charge level of, or an availability of a wearable accessory disposed on a respective accessory area. The hub station may further include charging devices associated with at least some of the accessory areas. Each charging device may be configured to provide wireless charging to a wearable accessory disposed on a respective accessory area, and each charging device may include at least one of an inductive coil disposed within the housing, an electrical contact co-extensive with a surface of the housing, or a pogo pin configured for connection with a respective wearable accessory. One or more of the registration devices can include magnets having predefined pole patterns configured to align or secure a wearable accessory with a respective accessory area. One or more of the registration devices can include a locking mechanism having a locked position configured to secure a wearable accessory to a respective accessory area and an unlocked position configured to allow removal of the wearable accessory from the respective accessory area.

A second aspect of the disclosed embodiments is a method. The method includes receiving, by a hub station, notification information associated with a communication request for a head-mounted display usable with a wearable accessory located at the hub station. The method includes generating an indication, by a hub indicator of the hub station, based on the notification information. The method includes receiving, by the hub station, configuration information that designates at least one of user information for, a charge level of, or an availability of the wearable accessory. The method includes generating another indication, by the hub indicator of the hub station, based on the configuration information.

In the second aspect, the wearable accessory may be received on an accessory area of the hub station, and the head-mounted display may be spaced from the hub station and the wearable accessory. The method can further include receiving, by the hub station, approval information associated with the communication request for the head-mounted display usable with the wearable accessory and enabling communication between the hub station and a remote device associated with the communication request. The method may further include receiving, by the hub station, handoff information associated with the head-mounted display and enabling communication between the head-mounted display and the remote device associated with the communication request based on the handoff information.

A third aspect of the disclosed embodiments is a hub station for a wearable accessory. The hub station includes a receptacle configured to receive and support the wearable accessory and a hub indicator associated with the receptacle. The hub indicator is configured to provide an indication designating at least one of user information for, a charge level of, or an availability of the wearable accessory when the wearable accessory is supported by the receptacle. The hub station includes a processor configured to receive a notification for the wearable accessory and send instructions to activate the hub indicator based on the notification.

In the third aspect, the hub indicator can include a first color, shape, or pattern associated with the indication and a second color, shape, or pattern associated with the notification. The hub indicator may include a display. The display can be configured to provide the indication designating the user information that includes a textual or pictorial representation of the user information. The hub indicator may be configured to provide the indication designating the charge level of the wearable accessory using a first color, shape, or pattern. The hub indicator may be configured to provide the indication designating the availability of the wearable accessory using a second color, shape, or pattern. The wearable accessory can include a wearable indicator, and the processor can be further configured to send instructions to activate the wearable indicator based on the notification. The notification for the wearable accessory can be received from a head-mounted display that is usable with the wearable accessory and spaced from the hub station. The notification can be received based on a communication request sent to the head-mounted display. The hub station may include a locking mechanism having a locked position configured to secure the wearable accessory to the receptacle and an unlocked position configured to allow removal of the wearable accessory from the receptacle. The indication designating the availability of the wearable accessory can be based on the position of the locking mechanism. The hub indicator can be disposed on a surface of the hub station at a location adjacent to the receptacle.

BRIEF DESCRIPTION OF THE DRAWINGS

FIG. 2A is a sectional view through an example of a hub station for use with the wearable accessories of FIG. 1.

FIG. 2B is another sectional view through the hub station of FIG. 2A.

DETAILED DESCRIPTION

Hub stations for wearable accessories, such as associated with a head-mountable display (HMD), provide useful features to improve organization of such wearable accessories. The hub stations can also support users distinguishing between wearable accessories with indications related to user information for, charge level of, and availability for use of given wearable accessories. Some of the hub stations described herein can implement access controls for wearable accessories and support communication between the hub station and remote devices even when associated wearable accessories are not currently in use with an HMD.

Figure 1:
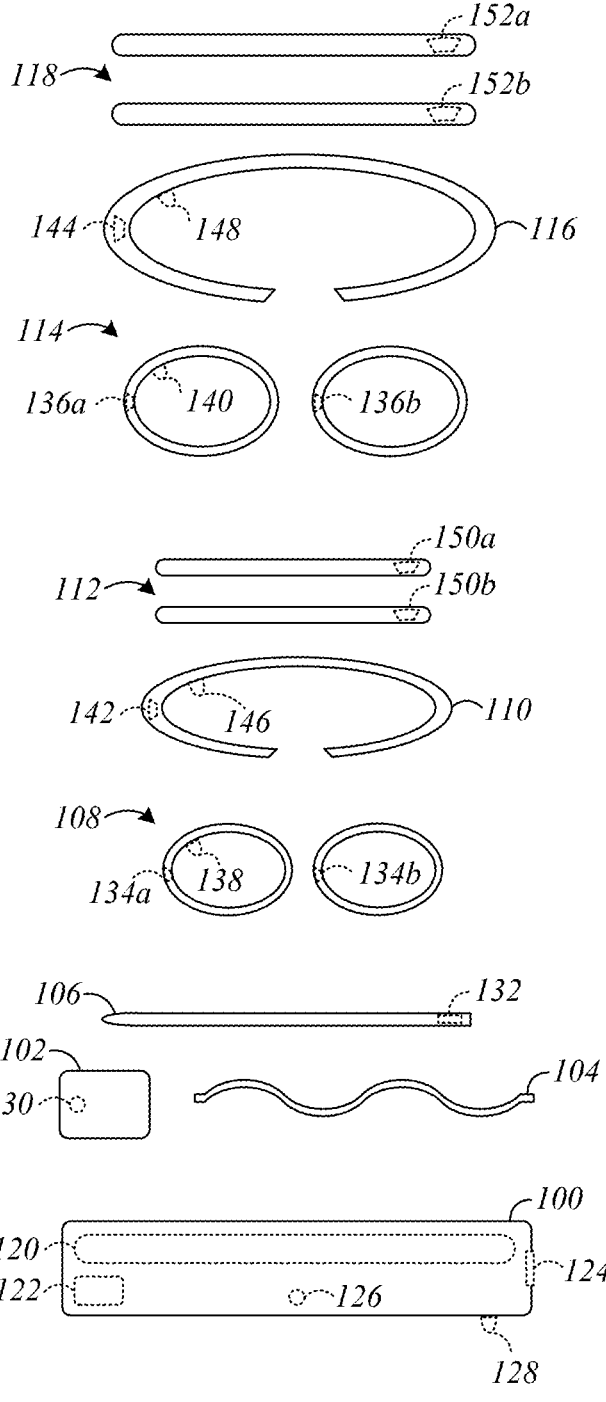
FIG. 1 is a schematic view of wearable accessories.

FIG. 1 is a schematic view of wearable accessories. The wearable accessories include an HMD 100, a power pack 102, a cord or cable 104, and an input device 106. The wearable accessories also include a first set of lenses 108, a first face seal 110, and a first set of temple arms 112 sized and shape, for example, for use with the HMD 100 by a first user. The wearable accessories also include a second set of lenses 114, a second face seal 116, and a second set of temple arms 118 sized and shape, for example, for use with the HMD 100 by a second user having a different head size, different face shape, and/or different vision characteristics than the first user. Though wearable accessories suitable for different first and second users are shown, such as for a child and an adult, it is understood that wearable accessories suitable for a greater number of users is also possible.

The HMD 100 can include features such as a display 120, a controller 122, an input/output (I/O) interface 124, a sensor 126, an indicator 128, one or more audio components (not shown), and a power source (not shown). Several of these components are shown in dotted line to indicate the components are optional in presence or may have a different location within the HMD 100. The HMD 100 is designed to be worn on heads of a different users at different times, display graphic or visual content to the users, and generate audio content for projection to the users. The graphic content can be associated with computer-generated reality or augmented reality. The audio content can be associated with the graphic content.

The display 120 can be situated within a housing of the HMD 100 and can include one or more display screens (not shown) such as liquid crystal display(s) (LCD), organic light-emitting diodes (OLED), or other display types that project light to eyes of the users or project light onto a reflector (e.g., a lens) to be reflected to the users. In the example of FIG. 1, the display 120 can project light to the first and second sets of lenses 108, 114 when such sets of lenses 108, 114 are positioned for alignment with eyes of the respective first and second users when wearing the HMD 100. The display 120 can be usable without the first and second sets of lenses 108, 114.

The controller 122 can include a processor, a memory device, and a storage device. The controller 122 is configured to send commands to and receive information from the display 120, the I/O interface 124, the sensor 126, and the indicator 128. The I/O interface 124 may include any type of human-machine interface or component-component interface, such as a button, a switch, a slot, a connector, a touchscreen input or output device, a gestural input device, a wireless communication device, or an audio input or output device. For example, the cord or cable 104 may be connected to the I/O interface 124 to supply power or data to the HMD 100 or transfer data to/from the HMD 100. In another example, the I/O interface 124 may include a wireless communication device allowing the HMD 100 to send information to other associated wearable accessories.

The sensor 126 may include angular, inertial, or gyroscopic capabilities to determine an orientation of the HMD 100. The sensor 126 may include radar, lidar, acoustic, hall-effect, or volumetric capabilities to determine shapes or sizes of a user of the HMD 100 or an environment surrounding the HMD 100. The sensor 126 may be configured for imaging, temperature sensing, or pressure sensing. Other capabilities of the sensor 126 are contemplated to support operation of the HMD 100 and other associated wearable accessories.

The indicator 128 may include a light, a display, a haptic feedback device, a speaker configured to output audio, or other features suitable to provide an indication or notification to a user of the HMD 100 or other persons in a vicinity of the HMD 100. For example, if the indicator 128 includes a light, an indication or notification may include a predetermined color or pattern of light emission from the indicator 128 to communicate a specific message or condition.

If present, the internal power source (not shown) can include a battery or other power source that stores energy for providing electrical power to the display 120, the controller 122, the I/O interface 124, the sensor 126, the indicator 128, or other electronics (not shown) of the HMD 100, such as circuit boards, communication devices, transducers, and/or transceivers. In some implementations, the HMD 100 may not include either an internal power source or power storage, in which case, the cord or cable 104 can supply power from the battery pack 102 for operating, but not charging, the HMD 100.

The battery pack 102, in addition to storing energy to provide electrical power to the HMD 100, can include an I/O interface 130 that allows connection to the cord or cable 104 as well as connection to alternate power sources (e.g., through a pogo pin or contact locations, not shown) to allow charging the battery pack 102. The cord or cable 104 can be flexible, can include power and data transfer capabilities, or can be optional. For example, the battery pack 102 may be connectable to the HMD 100 through a different component or may be directly connectable to the HMD 100 without use of the cord or cable 104.

The input device 106 can be shaped as a stylus as shown or be in the form of a remote-control device holdable by a user (not shown) while operating the HMD 100. The input device 106 may also be in the form of another wearable device such as a wrist-worn device, an ankle-worn device, a neck-worn device, or other device (not shown) configured to be carried by a user while operating the HMD 100. The input device 106 may include an electronics unit 132. The electronics unit 132 can include a beacon or other wireless device that transmits location information. The electronics unit 132 may include a processor, a memory device, and a storage device, for example, to store configuration information for the input device 106. The configuration information may associate the input device 106 with one or more users or otherwise control operation of the input device 106 with respect to the HMD 100.

The first and second set of lenses 108, 114 are configured for use with the HMD 100 by first and second users, respectively. The first set of lenses 108 may have a different size, magnification type, filter, or other optical quality than the second set of lenses 114. Both the first and second set of lenses 108, 114 are usable with the HMD 100 to improve viewability of the display 120, though generally not at the same time. For example, the first and second set of lenses 108, 114 may be designed to improve focus, manage astigmatism, or correct near-sightedness. As shown, the first set of lenses 108 is smaller than the second set of lenses 114. The first set of lenses 108 includes electronics units 134*a,b* and the second set of lenses 114 includes electronics units 136*a,b*. The electronics units 134*a,b*, 136*a,b* may include processors, memory devices, and storage devices, for example, to store configuration information for the respective first and second sets of lenses 108, 114. The configuration information may associate the first and second sets of lenses 108, 114 with respective first and second users or otherwise configure the first and second sets of lenses 108, 114 for use with the HMD 100.

The first set of lenses 108 includes an indicator 138 and the second set of lenses 114 includes an indicator 140. The indicators 138, 140 may include a light, a display, a haptic feedback device, or other mechanisms to provide an indication or a notification to a person in a vicinity of the first or second set of lenses 108, 114 even when the first and second set of lenses 108, 114 are not in use with the HMD 100. For example, if the indicators 138, 140 include lighted features, notifications may be provided using a predetermined color or pattern of light emission from the indicators 138, 140 to communicate a specific message or condition. The color of the light may be different for the indicator 138 than for the indicator 140 to better distinguish the notifications between users should the first and second sets of lenses 108, 114 be in a similar location (such as at one of the hub stations described herein).

The first and second face seals 110, 116 are configured for use with the HMD 100 by first and second users, respectively. The first face seal 110 may have a different size, shape, material construction, or thickness than the second face seal 116. The first and second face seals 110, 116 are usable with the HMD 100 to comfortably secure the HMD 100 to the face of the first and second users, respectively, though generally not at the same time. As shown, the first face seal 110 is smaller than the second face seal 116. The first face seal 110 includes electronics unit 142 and the second face seal 116 includes electronics unit 144. The electronics units 142, 144 may include processors, memory devices, and storage devices, for example, to store configuration information for the respective first and second face seals 110, 116. The configuration information may associate the first and second face seals 110, 116 with respective first and second users or otherwise configure the first and second face seals 110, 116 for use with the HMD 100.

The first face seal 110 includes an indicator 146 and the second face seal 116 includes an indicator 148. The indicators 146, 148 may include a light, a display, a haptic feedback device, or other means to provide an indication or a notification to a person in a vicinity of the first or second face seal 110, 116, even when the first and second face seals 110, 116 are not in use with the HMD 100. For example, if the indicators 146, 148 includes lighted features, notifications may be provided using a predetermined color or pattern of light emission from the indicators 146, 148 to communicate a specific message or condition. The color of the light may be different for the indicator 146 than for the indicator 148 to better distinguish the notifications between users should the first and second face seals 110, 116 be in a similar location (such as at one of the hub stations described herein).

The first and second sets of temple arms 112, 118 are configured for use with the HMD 100 by first and second users, respectively. The first set of temple arms 112 is smaller than the second set of temple arms 118. The first and second sets of temple arms 112, 118 can be sized and shaped to engage different sizes and shapes of heads to better support the HMD 100 on the heads (and, optionally, ears) of the users. The first and second sets of temple arms 112, 118 may, for example, be configured as multi-piece supports that engage temples and ears (as shown) or may include a strap or band (not shown) that extends rearward of the HMD 100 along sides and backs of the heads of the users. The first and second sets of temple arms 112, 118 may, for example, include or be made of one or more flexible and/or elastic materials such as rubber or other polymeric material suitable to conform to varied head shapes of users.

The first set of temple arms 112 includes electronics units 150*a,b* and the second set of temple arms 118 includes electronics units 152*a,b*. The electronics units 150*a,b*, 152*a,b* may include processors, memory devices, and storage devices, for example, to store configuration information for the respective first and second sets of temple arms 112, 118. The configuration information may associate the first and second sets of temple arms 112, 118 with respective first and second users or otherwise configure the first and second sets of temple arms 112, 118 for use with the HMD 100.

The significant number of wearable accessories shown in FIG. 1, some of which are sized and configured for personal use by respective first and second users that share use of the HMD 100, poses a challenge in organization, storage, and identification of such wearable accessories. The hub stations described herein provide various features to improve organization of such wearable accessories and identify personalized version of such wearable accessories. Some of the hub stations described herein can manage access to such wearable accessories and leverage communication and notification features of such wearable accessories when not in use with the HMD 100.

FIG. 2A is a sectional view in the X-Y plane through an example of a hub station 200 for use with the wearable accessories of FIG. 1. FIG. 2B is another sectional view in the X-Y plane through the hub station 200 of FIG. 2A, for example, at a different depth in the Z direction than is shown in FIG. 2A. The coordinates, X and Y, are shown.

The hub station 200 includes a housing 202 with accessory areas 204*a,b,c*. In the example of FIG. 2A, the accessory areas 204*a,b* include depressions within the housing 202. In the example of FIG. 2B, the accessory area 204*c* is located along an upper surface of the housing 202. The accessory areas 204*a,b,c* of the housing 202 are configured to receive and support wearable accessories. In FIG. 2A, the accessory areas 204*a,b* include receptacles 206*a,b*, that is, the depressions have walls that are shaped to receive one or more wearable accessories and to secure a location of such wearable accessories (not shown).

For example, the first set of lenses 108, the first face seal 110, and/or the first set of temple arms 112 described with respect to FIG. 1 may be receivable within the accessory area 204*a*, that is, fitted within the receptacle 206*a*, to provide storage, organization, and ease of identification of personalized items by a first user. The second set of lenses 114, the second face seal 116, and/or the second set of temple arms 118 may be receivable within the accessory area 204*b*, that is, fitted within the receptacle 206*b*, to provide storage, organization, and ease of identification of personalized items by a second user. The power pack 102, the cord or cable 104, the input device 106, and optionally, the HMD 100 may be receivable within the accessory area 204*c* shown in FIG. 2B, that is, placed on the accessory area 204*c* for support by the housing 202.

The hub station 200 includes a hub controller 208, shown in dotted line. The hub controller 208 can include a processor, a memory device, and a storage device. The hub controller 208 may be configured to send information to and/or receive information from various wearable accessories, including the HMD 100, when such wearable accessories are housed on or near the hub station 200. The hub controller 208 can also implement various functions of the hub station 200 as described herein.

The hub station 200 includes hub indicators 210*a,b*. The hub indicator 210*a* is associated with the accessory area 204*a*, and the hub indicator 210*b* is associated with the accessory area 204*b*. Each of the hub indicators 210*a,b* is configured to provide an indication or a notification associated with one or more wearable accessories (not shown) disposed on the respective accessory areas 204*a,b*, for example, stored in the respective receptacles 206*a,b*. The indicators 210*a,b* can include a light, a display, a haptic feedback device, a speaker configured to output audio, or other means to provide an indication or a notification. For example, the indicators 210*a,b* may be configured to emit a predetermined color or pattern of light to communicate a specific message or condition when receiving instructions to generate a notification, for example, from the hub controller 208.

The use of the hub indicators 210*a,b* with the hub station 200 allows for wearable accessories other than the HMD 100 to serve as conduits for notifications to specific users when multiple users share the HMD 100. For example, a notification can be provided using the hub indicator 210*a* when a wearable accessory, such as the first set of lenses 108, the first face seal 110, and/or the first set of temple arms 112, is stored in the receptacle 206*a* of the accessory area 204*a* and the hub station 200 receives information indicative of an incoming communication for the HMD 100, for example, at the hub controller 208. This is especially useful when the HMD 100 is spaced from the hub station 200, such as in another room. In this example, and when the HMD 100 is spaced from the hub station 200, the hub indicator 210*a* can emit a predetermined color or pattern of light to notify a user proximate to the hub station 200, though not necessarily proximate to the HMD 100, that the HMD 100 is receiving a notification such as a communication request for a specific user, that is, for the specific user associated with the wearable accessory(ies) stored in the receptacle 206*a* of the accessory area 204*a*.

In another example, the use of the hub indicators 210*a,b* with the hub station 200 can provide information specific to one or more wearable accessories present in one of the accessory areas 204*a,b,c*, such as stored or located within the receptacles 206*a,b* of the accessory areas 204*a,b* or located on the surface of the accessory area 204*c*. For example, the hub indicators 210*a,b* can be configured to provide an indication designating configuration information for a wearable accessory. This configuration information can include user information for, a charge level of, or an availability of a wearable accessory disposed on one of the respective accessory areas 204*a,b,c*.

In another example, the first set of lenses 108, the first face seal 110, and/or the first set of temple arms 112 can be stored within the receptacle 206*a*, and user identification information, a type of user information, can be relayed from one or more of these wearable accessories to the hub station 200, such as by ultra-wide band or WiFi, confirming presence of such wearable accessories and identifying a user associated with such wearable accessories. This user identification information may have been associated with the first set of lenses 108, the first face seal 110, and/or the first set of temple arms 112 during a registration process associated with the HMD 100 or may have been entered, for example, by a user of the HMD 100 or the hub station 200 in programming the HMD 100 or the hub station 200. The hub indicator 210*a* may emit light of a certain color to indicate user association with one or more wearable accessories in the receptacle 206*a*. That is, the first set of lenses 108, the first face seal 110, and/or the first set of temple arms 112 may be associated with a first user and such association may be shown by a blue, red, yellow (or other color) light by the hub indicator 210*a* to aid the first user in identifying their personal wearable accessories stored at the hub station 200.

In another example, the power pack 102, the cord or cable 104, or the input device 106 can be placed within one of the accessory areas 204*a,b,c* and a charge level for the power pack 102, the cord or cable 104, or the input device 106 can be relayed to the hub station 200. The charge level can be displayed by one of the hub indicators 210*a,b*, by the wearable accessory directly, or by another means (not shown). Though single hub indicators 210*a,b* are shown as associated with single accessory areas 204*a,b*, the hub indicators 210*a,b* may be configured to show different indications (such as different charge levels) for different wearable accessories.

In another example, the first set of lenses 108, the first face seal 110, and/or the first set of temple arms 112 can be stored within the receptacle 206*a*, and availability information can be relayed from one or more of these wearable accessories to the hub station 200, such as by ultra-wide band or WiFi, confirming that such wearable accessories are available for use. This availability information may have been associated with the first set of lenses 108, the first face seal 110, and/or the first set of temple arms 112 during a rental process associated with the HMD 100 or may have been entered, for example, by an owner or manager of the HMD 100 or the hub station 200 in programming the HMD 100 or the hub station 200. The hub indicator 210*a* may emit light of a certain color (e.g., green) or display a certain shape (e.g., a check mark) to indicate availability of one or more wearable accessories in the receptacle 206*a* of the accessory area 204*a*. The hub indicator 210*a* may emit light of a different color (e.g., red) or display a different shape (e.g., an X) to indicate lack of availability of one or more wearable accessories in the receptacle 206*a* of the accessory area 204a. Such availability information can be useful, for example, when the HMD 100 has a shared, enterprise use, and the hub station 200 can thus serve to organize and indicate availability of various types, shapes, and sizes of wearable accessories for use of the HMD 100 by multiple users.

The hub station 200 includes registration devices associated with at least some of the accessory areas 204a,b,c. Each registration device is configured to orient one or more wearable accessories to at least one of the accessory areas 204,a,b,c. In the example of FIG. 2A, the receptacles 206a,b can orient and position one or more wearable accessories within the accessory areas 204a,b of the housing 202. In the example of FIG. 2B, magnets 212a,b,c having predefined pole patterns are configured to align or secure various wearable accessories with the accessory area 204c. For example, the input device 106 can include magnetic material, and dropping the input device 106 onto the accessory area 204c near the magnets 212a can cause the magnets 212a to snap, rotate, or otherwise orient the input device 106 (based on interaction between the magnets 212a and the magnetic material within the input device 106) into a position consistent with keeping the input device 106 in place on the surface of the accessory area 204c and in an orientation suitable, for example, for charging of the input device 106 by the hub station 200 as described herein. In other words, the magnets 212a,b,c may include multi-pole magnet arrays that correspond with magnetic material in various wearable accessories, such as the input device 106 and the power pack 102, and the hub station 200 can cause such magnetic material to lock in place when properly oriented and kick-back when misaligned.

The hub station 200 includes charging devices 214a,b,c associated with the accessory areas 204a,b,c. The charging devices 214a,b,c are configured to provide wireless charging to one or more wearable accessories disposed on the respective accessory areas 204a,b,c. The charging devices 214a,b,c may include an inductive coil disposed within the housing 202 of the hub station 200, such as the charging devices 214a,b associated with the receptacles 206a,b in FIG. 2A, a conductive mat such as the charging device 214c associated with the accessory area 204c in FIG. 2B, an electrical contact (not shown) co-extensive with a surface of the housing 202 of the hub station 200, or a pogo pin (not shown) extending from a surface of the housing 202 of the hub station 200. The various charging devices 214a,b,c are configured for charging various wearable accessories. In some examples, the charging devices 214a,b,c can be configured to provide charge level information for various wearable accessories to the hub controller 208 for use in providing charge level indications using the hub indicators 210a,b, such as when such wearable accessories are being charged by the charging devices 214a,b,c.

Figure 3A:
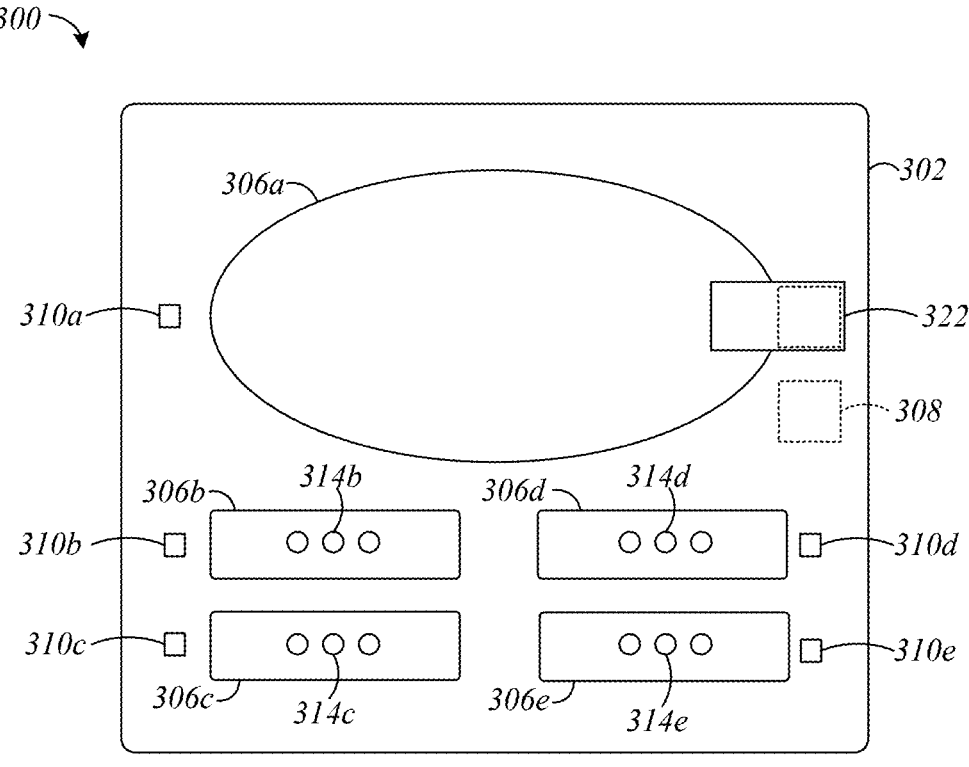
FIG. 3A is a top view of another example of a hub station for use with the wearable accessories of FIG. 1.
Figure 3B:
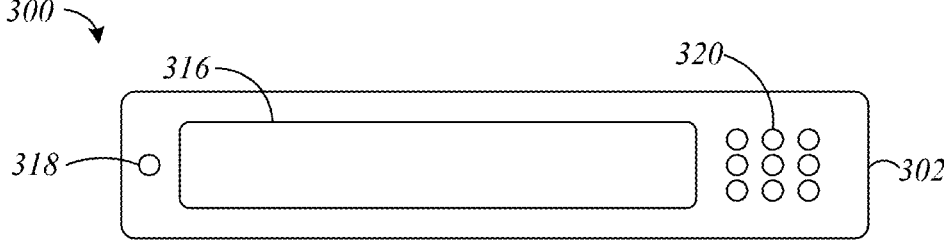
FIG. 3B is a side view of the hub station of FIG. 3A.

FIG. 3A is a top view of another example of a hub station 300 for use with the wearable accessories of FIG. 1. FIG. 3B is a side view of the hub station 300 of FIG. 3A.

The hub station 300 includes a housing 302 with receptacles 306a,b,c,d,e as shown in FIG. 3A. The receptacles 306a,b,c,d,e in this example are differently shaped depressions within an upper surface of the housing 302. The receptacles 306a,b,c,d,e are configured to receive and support wearable accessories. For example, the first face seal 110 and/or the second face seal 116 may be receivable within the receptacle 306a that has a generally oval shape, that is, fitted within the receptacle 306a, to provide storage, organization, and ease of identification of personalized wearable accessories by a first user and/or a second user. The first set of lenses 108 and/or the second set of lenses 114 may be receivable within the receptacles 306b,c,d,e, that is, portions may be fitted within the respective receptacles 306b,c,d,e to provide storage, organization, and ease of identification of personalized wearable accessories by the first user and/or the second user.

The hub station 300 includes a processor 308, shown in dotted line as internal to the housing 302. The processor 308 can be in communication with a memory device and a storage device (not shown). The processor 308 may be configured to send information to and/or receive information from various wearable accessories, including the HMD 100, when such wearable accessories are housed on or near the hub station 300. The processor 308 can also implement various functions of the hub station 300 as described herein.

The hub station 300 includes hub indicators 310a,b,c,d,e. The hub indicator 310a is associated with the receptacle 306a, the hub indicator 310b is associated with the receptacle 306b, the hub indicator 310c is associated with the receptacle 306c, the hub indicator 310d is associated with the receptacle 306d, and the hub indicator 310e is associated with the receptacle 306e. In this example, each of the hub indicators 310a,b,c,d,e is disposed on a surface of the hub station 300 at a location adjacent to one of the receptacles 306a,b,c,d,e. Each of the hub indicators 310a,b,c,d,e is configured to provide an indication designating configuration information, that is, at least one of user information for, a charge level of, or an availability of a wearable accessory when the wearable accessory is supported by the respective receptacle 306a,b,c,d,e. The types of indications associated with user information, charge level, and availability, be it colors, patterns, sounds, or otherwise, may be similar to those described in respect to FIGS. 2A and 2B. For example, the hub indicators 310b,c,d,e can be configured to provide indications designating the charge level of the wearable accessories in the receptacles 306b,c,d,e using a first color, shape, or pattern and designating availability of the wearable accessories in the receptacles 306b,c,d,e using a second color, shape, or pattern.

The hub indicators 310a,b,c,d,e may also be used to provide notifications received by the hub station 300, for example, from an external device such as the HMD 100. That is, the processor 308 may receive a notification from the HMD 100 that can be associated with a wearable accessory disposed in one of the receptacles 306a,b,c,d,e. Based on the notification, the processor 308 can send instructions to activate a relevant one of the hub indicators 310a,b,c,d,e. Since the HMD 100 may be usable with different wearable accessories for different users, and since the HMD 100 may be physically spaced from the hub station 300, such as in another room, use of the hub indicators 310a,b,c,d,e for both indications and notifications allows a user to receive information from and about both the wearable accessories and the HMD 100 despite the HMD 100 being spaced from the hub station 300, such as in use by another user.

For example, a notification can be received by the hub station 300 and the processor 308 can cause one or more of the hub indicators 310a,b,c,d,e to illuminate, emit a sound, or otherwise change state based on a communication request being sent to the HMD 100. Such a communication request can be sent, for example, by another user with another HMD (not shown) wishing to communicate with the HMD 100, that is, wishing to call the user of the HMD 100 or send a text message to the user of the HMD 100.

Referring to FIG. 3B, the hub station 300 includes a display 316, a sensor 318, and a speaker 320, the display 316 and the speaker 320 serving as additional hub indicators of the hub station 300. The display 316 can provide an indication designating user information associated, for example, with one or more wearable accessories when the wearable accessories are stored in the receptacles 306a,b,c,d,e. The display 316 can show a textual or pictorial representation of the user information, such as a specific icon or avatar associated with a user, a name of the user, or other information sufficient to allow a user to identify which of the wearable accessories stored at the hub station 300 are associated with the user.

The sensor 318 can include a microphone configured to receive or otherwise capture verbal commands or speech from a user proximate to the hub station 300. The sensor 318 can include an imaging device configured to capture an image of a user proximate to the hub station 300 or an environment surrounding the hub station 300, for example, for use in generating a virtual environment for use by the HMD 100. The sensor 318 can include other capabilities supporting information capture for use by the hub station 300 and/or the HMD 100. The speaker 320 can be configured to emit sound, such as associated with notifications incoming to the hub station 300 or calls or text messages being received by the HMD 100.

The display 316, the sensor 318, and the speaker 320 can together allow a user of the hub station 300 to interact with the HMD 100 remotely, for example, if the HMD 100 is configured to forward an incoming call for the user to the hub station 300 when various wearable accessories associated with the user are present at the hub station 300 (e.g., stored in the receptacles 306a,b,c,d,e). This remote interaction with the HMD 100 via the hub station 300 supports co-presence, communication in a physical environment and a virtual environment, and call hand-off between devices as a user of the HMD 100 moves between the physical environment of the hub station 300 and the virtual environment of the HMD 100.

For example, a user may receive a notification for an incoming call to the HMD 100 via the hub station 300 based on the user's wearable accessories being stored at the hub station 300. The user may be able to interact with the caller via the display 316 and/or speak with the caller via the sensor 318 and the speaker 320 to let the caller know that the user needs to locate and/or activate the HMD 100 to support the call in the virtual environment. By first receiving the call at the hub station 300, the user gains additional time to locate and assemble the various wearable accessories with the HMD 100. In addition, if the hub station 300 includes an outward-facing sensor with imaging capabilities, such as the sensor 318, the remote caller may be (optionally) able to view the user receiving the call before the user joins the virtual environment with the HMD 100. Similarly, if the hub station 300 includes the display 316, the user may be able to view the virtual environment of the caller using the display 316 prior to locating and using the HMD 100 to join the caller in the virtual environment. These features improve co-presence hand-off and user convenience.

In terms of hand-off of a call between the hub station 300 and the HMD 100, the hub station 300 may be configured to automatically transfer the call from the physical environment of the hub station 300 to the virtual environment of the HMD 100, for example, if the sensor 318 determines that the user has put on the HMD 100, saving the user from trying to find a button on the hub station 300 or the HMD 100 once the user puts on the HMD 100. In another example, the user may be able to use a button input or a tap sequence, such as clicking a button or tapping a surface twice on the HMD 100, to transfer the call. In another example, the sensor 318 of the hub station 300 or the HMD 100 could recognize a gesture input from the user to transfer the call from the hub station 300 to the HMD 100. In another example, the wearable accessories may be able to identify when a user puts on the HMD 100, such as if the electronics units 142, 144 of the first and second face seals 110, 116 include pressure sensing capabilities, if the electronics units 150a,b, 152a,b of the first and second sets of temple arms 112, 118 (or headbands, not shown) include tension sensing capabilities, or if the electronics units 134a,b, 136a,b, of the first and second sets of lenses 108, 114 include face or eye-tracking capabilities.

The hub station 300 includes charging devices 314b,c,d,e associated with the receptacles 306b,c,d,e. The charging devices 314b,c,d,e are configured to provide wireless charging to one or more wearable accessories, such as the first and second sets of lenses 108, 114, when disposed in the receptacles 306b,c,d,e. The charging devices 314b,c,d,e in the example in FIG. 3A include electrical contact locations co-extensive with a lower surface of the receptacles 306b, c,d,e. The shape of the receptacles 306b,c,d,e can be such to ensure that corresponding electrical contact locations (not shown) on the wearable accessories that fit within the receptacles 306b,c,d,e physically align with the electrical contact locations of the charging devices 314b,c,d,e. The charging devices 314b,c,d,e can be configured to pass both power and data to wearable accessories to support indication and notification features as well.

In some examples, the wearable accessories, such as the first and second sets of lenses 108, 114, include wearable indicators, such as the indicators 138, 140 shown in FIG. 1. The indicators 146, 148 of the first and second light seals 110, 116 can also be called wearable indicators. The wearable indicators (e.g., the indicators 138, 140) can include a light feature, a display feature, a haptic feature, or another feature that is configured to provide an indication or notification to a person in a vicinity of or otherwise proximate to the first or second set of lenses 108, 114 when first or second set of lenses 108, 114 are disposed, for example, in one or more of the receptacles 306b,c,d,e of the hub station 300. The processor 308 can be configured to activate the respective one of the indicators 138, 140, that is, cause light emission, a flash pattern, vibration, sound emission, or another indication or notification, either when the HMD 100 receives a notification for a user associated with the respective one of the first and second set of lenses 108, 114, or to designate configuration information such as user information for, a charge level of, or an availability of the first or second set of lenses 108, 114. In other words, either or both of the hub indicators 310b,c,d,e and the indicators 138,140 (the wearable indicators) of the first and second set of lenses 108, 114 may provide indications and/or notifications when these wearable accessories are disposed in respective ones of the receptacles 306b,c,d,e of the hub station 300.

As shown in FIG. 3A, the hub station 300 includes a locking mechanism 322. The locking mechanism 322 serves as a registration device configured to orient one or more wearable accessories with respect to the receptacle 306a. The locking mechanism 322 has a locked position shown in solid lines that is configured to secure a wearable accessory to the receptacle 306a, such as securing the first or second light seals 110, 116 within the receptacle 306a. The locking mechanism 322 has an unlocked position shown in dotted lines that is configured to allow removal of the wearable accessory from the receptacle 306a. In this example, the receptacle 306a is shaped and sized to support the first or second light seals 110, 116, and the locking mechanism 322 can extend over the receptacle 306a to physically obstruct removal of the first or second light seals 110, 116 in the locked position. The locking mechanism 322 can retract or otherwise fold away from the receptacle 306a to allow removal of the first or second light seals 110, 116 in the unlocked position shown in dotted lines. Other mechanisms for locking and unlocking the locking are possible.

The locking mechanism 322 can function in tandem with the hub indicator 310a. For example, an indication designating availability of a wearable accessory, here, the first or second light seals 110, 116 in the receptacle 306a, can be based on a position of the locking mechanism 322. If the locking mechanism 322 is in the locked position, the hub indicator 310a may display a red light, an X-shape, etc. If the locking mechanism 322 transitions to or is in the unlocked position, the hub indicator 310a may display a green light, a check mark, etc. Use of the locking mechanism 322 can be beneficial to implement, for example, parental, time, or access controls when the HMD 100 has shared use but personalized wearable accessories such as the first or second light seals 110, 116. In an example of parental control, the first light seal 110 may be associated with a first user, a child. The child's parent, optionally the second user, may configure the hub station 300 such that the locking mechanism 322 secures the first light seal 110 within the receptacle 306a from early morning until early evening on weekdays to prohibit the child from using the HMD 100 during traditional school hours.

Figure 4:
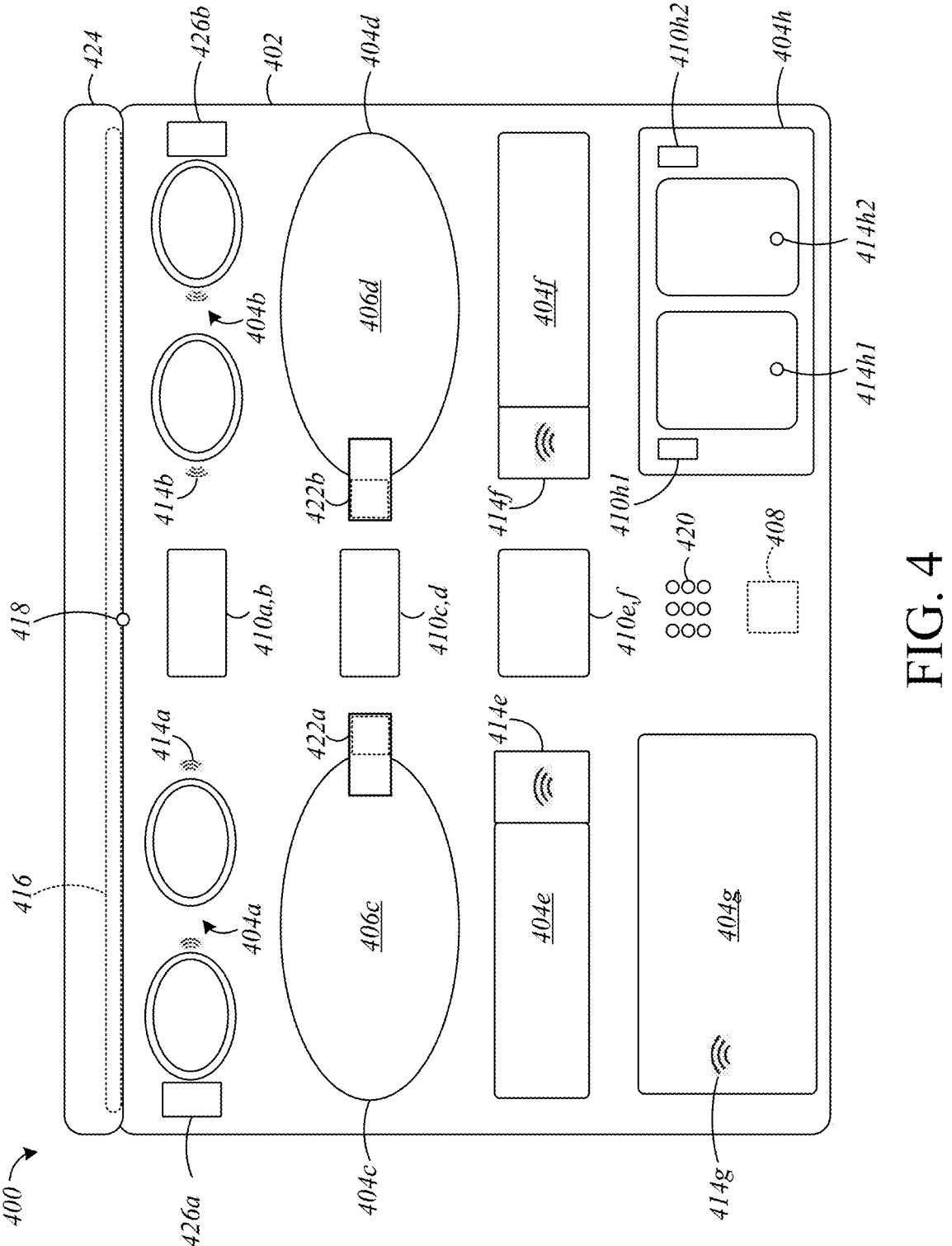
FIG. 4 is a top view of another example of a hub station for use with the wearable accessories of FIG. 1.

FIG. 4 is a top view of another example of a hub station 400 for use with the wearable accessories of FIG. 1. The hub station 400 includes a housing 402 with accessory areas 404a,b,c,d,e,f,g,h, some of which include receptacles 406c,d given element numbers to align with the element numbers of the associated accessory areas 404c,d. The accessory areas 404a,b,c,d,e,f,g,h are configured to receive and support wearable accessories and can assist in organizing such wearable accessories for multiple users of the HMD 100. For example, the first set of lenses 108 can be received within the accessory area 404a, the second set of lenses 114 can be received within the accessory area 404b, the first face seal 110 can be received within the receptacle 406c of the accessory area 404c, and the second face seal 116 can be received within the receptacle 406d of the accessory area 404d. The receptacles 406c,d can be depressions defined within the housing 402 with oval shaping. The first set of temple arms 112 can be received within the accessory area 404e, the second set of temple arms 118 can be received within the accessory area 404f, and the power pack 102 (as well as an additional power pack, not shown) can be received in the accessory area 404h. The accessory areas 404a,b,c,d,e,f,g,h provide storage, organization, and ease of identification of personalized wearable accessories.

The hub station 400 includes a processor 408, shown in dotted line as internal to the housing 402. The processor 408 can be in communication with a memory device and a storage device (not shown). The processor 408 may be configured to send information to and/or receive information from various wearable accessories, including the HMD 100, when such wearable accessories are housed on or near the hub station 400. The processor 408 can also implement various functions of the hub station 400 as described herein.

The hub station 400 includes hub indicators 410a,b,c,d, e,f,h1,h2. The hub indicator 410a,b is associated with the accessory areas 404a,b, the hub indicator 410c,d is associated with the accessory areas 404c,d that include the receptacles 406c,d, the hub indicator 410e,f is associated with the accessory areas 404e,f, and the hub indicators 410h1,h2 are associated with the accessory area 404h. In this example, each of the hub indicators 410a,b,c,d,e,f,h1,h2 is disposed on a surface of the hub station 400 at a location adjacent to respective accessory areas 404a,b,c,d,e,f,h. Each of the hub indicators 410a,b,c,d,e,f,h1,h2 is configured to provide an indication designating configuration information such as user information for, a charge level of, or an availability of a wearable accessory when the wearable accessory is located within the corresponding one of the accessory areas 404a, b,c,d,e,f,h. The types of indications associated with user information, charge level, and availability, be it colors, patterns, sounds, or otherwise, may be similar to those described in respect to FIGS. 2A, 2B, 3A, and 3B. In addition, the hub indicators 410a,b,c,d,e,f may include displays such that text, graphics, or other visual indications that denote user information, charge level, and availability may be shown when wearable accessories are located within the respective accessory areas 404a,b,c,d,e,f.

The hub indicators 410a,b,c,d,e,f may also be used to provide notifications received by the hub station 400, for example, from an external device such as the HMD 100. That is, the processor 408 may receive a notification from the HMD 100 that can be associated with a wearable accessory located in one of the accessory areas 404a,b,c,d,e,f Based on the notification, the processor 408 can send instructions to activate a relevant one of the hub indicators 410a,b,c,d,e,f. Since the HMD 100 may be usable with different wearable accessories for different users, and since the HMD 100 may be physically spaced from the hub station 400, such as in another room, use of the hub indicators 410a,b,c,d,e,f for both indications and notifications allows a user to receive information from and about both the wearable accessories and the HMD 100 despite the HMD 100 being spaced from the hub station 400, such as in use by another user or stored in another location.

The hub station 400 includes a cover 424 with a display 416. The cover 424, shown extending generally vertically from a surface of the housing 402 in the top view of FIG. 4, may be sized to fold or rest over the surface of the housing 402, blocking access to the accessory areas 404a,b,c,d,e,f, g,h in a storage position (not shown). The display 416 is shown in dotted line as not visible in the top view. The display 416 can include a larger screen that fills a majority of a surface of the cover 424. The display 416 can be used as a hub indicator to show user information, such as a textual or pictorial representation of the user information. The display 416 can be used show a virtual environment being experienced with the HMD 100 to allow the user of the HMD 100 to share the virtual experience with other persons in the physical environment. The display 416 can be touch sensitive. The display can be configured to allow a user to view and update configuration information for various wearable accessories stored at the hub station 400. Other features of the display 416 are described in additional examples herein.

The hub station 400 includes a sensor 418 and a speaker 420. The sensor 418 can include a microphone configured to receive or otherwise capture verbal commands or speech from a user proximate to the hub station 400. The sensor 418 can include an imaging device configured to capture an image of a user proximate to the hub station 400 or an environment surrounding the hub station 400, for example, for use in generating a virtual environment for use by the HMD 100 or for use by the hub station 400 in video conferencing with other users. The sensor 418 can include other capabilities supporting information capture for use by the hub station 400 and/or the HMD 100. The speaker 420 can be configured to emit sound to pass along notifications incoming to the hub station 400 or to support calls being received by the HMD 100 or the hub station 400.

The display 416, the sensor 418, and the speaker 420 can individually or together allow a user of the hub station 400 to interact with the HMD 100 without wearing the HMD 100, such as in the manner described with respect to FIGS. 3A and 3B for co-presence and call hand-off. In another example, the user may receive a notification for an incoming call to the HMD 100 via the hub station 400 based on the user's wearable accessories being stored at the hub station 400. The user may be able to interact with the caller via the display 416 and/or speak with the caller via the sensor 418 and the speaker 420. The user can choose whether to locate and/or activate the HMD 100 to transition the call to the virtual environment or continue the call using the hub station 400 in the physical environment. The display 416 of the hub station 400 may allow the user to see the incoming caller's virtual environment, should the caller be using another HMD, and the sensor 418 of the hub station 400 may capture the user's physical environment to share with the caller in a video-conference manner connecting the physical with the virtual.

The hub station 400 includes charging devices 414*a,b,e, f,g,h1,h2* associated with the accessory areas 404*a,b,e,f,g,h*. The charging devices 414*a,b,e,f,g,h1,h2* are configured to provide wireless charging to wearable accessories, such as the first and second sets of lenses 108, 114, the first and second sets of temple arms 112, 118, and the power pack 102, when such wearable accessories are stored in the accessory areas 404*a,b,e,f,g,h*. The charging devices 414*a, b,e,f,g* in the example in FIG. 4 include wireless, inductive charging devices. The charging devices 414*h1,h2* include pogo pins receivable within, for example, the power pack 102 (and another power pack, not shown) to promote faster charging. In some examples, the charging devices 414*a,b, e,f,g,h1,h2* can be configured to pass both power and data to corresponding wearable accessories to support indication and notification features.

The hub station 400 can provide indications and notifications to wearable accessories in the accessory areas 404*a, b,c,d,e,f,h* both through use of the hub indicators 410*a,b,c, d,e,f,h1,h2* and by use of the indicators 138, 140, 146, 148 on the wearable accessories as described in respect to FIGS. 1, 3A, and 3B. The hub station 400 also includes light-guide indicators 426*a,b* associated with the accessory areas 404*a, b*. When at least one lens, for example, from the first and second sets of lenses 108, 114, is secured in one of the accessory areas 404*a,b* proximate to one of the light-guide indicators 426*a,b*, the processor 408 can send a command, based on receipt of a notification or indication, to activate one of the light-guide indicators 426*a,b*. The activated one of the light-guide indicators 426*a,b* will then emit light into an edge of the proximate lens, the light will the reflect within the lens, then refract out from the lens, causing a glow to emit from most of a surface of the lens. The use of the light-guide indicators 426*a,b* is another way to send a visual indication that a user associated with the glowing lens (that is, from the first and second sets of lenses 108, 114) is receiving, for example, a call from an HMD of another user.

The hub station 400 includes locking mechanisms 422*a,b*. The locking mechanisms 422*a,b* serve as registration devices to orient and secure the wearable accessories in the accessory areas 404*c,d* and within the receptacles 406*c,d*. The locking mechanisms 422*a,b* have locked positions shown in solid lines and configured to secure wearable accessories in the receptacles 406*c,d* of the accessory areas 404*c,d* and unlocked positions shown in dotted lines and configured to allow removal of the wearable accessories from the receptacles 406*c,d* of the accessory areas 404*c,d*. The locking mechanisms 422*a,b* can function in a similar manner to the locking mechanism 322 described with respect to FIG. 3A.

The accessory area 404*g* may extend along a surface of the hub station 400 without a registration device, that is, without a locating feature, to allow a user of the hub station 400 to provide charging and storage for additional devices, such as ear buds, a smart watch, a smart ring, a smart phone, the input device 106, etc. that are not necessarily described with respect to FIG. 1 and that may not be directly associated with the HMD 100. The charging device 414*g* may provide wireless inductive charging to such additional devices. The hub station 400 may be configured to receive user information from such additional devices. The user information communicated by such additional devices may cause indications or notifications to be pushed to various ones of the wearable accessories. The user information communicated by such additional devices may be used to actuate one of the locking mechanisms 422*a,b* to move to an unlocked position to allow a user associated with the user information to access wearable accessories within the relevant one of the accessory areas 404*c*,404*d*.

Figure 5:
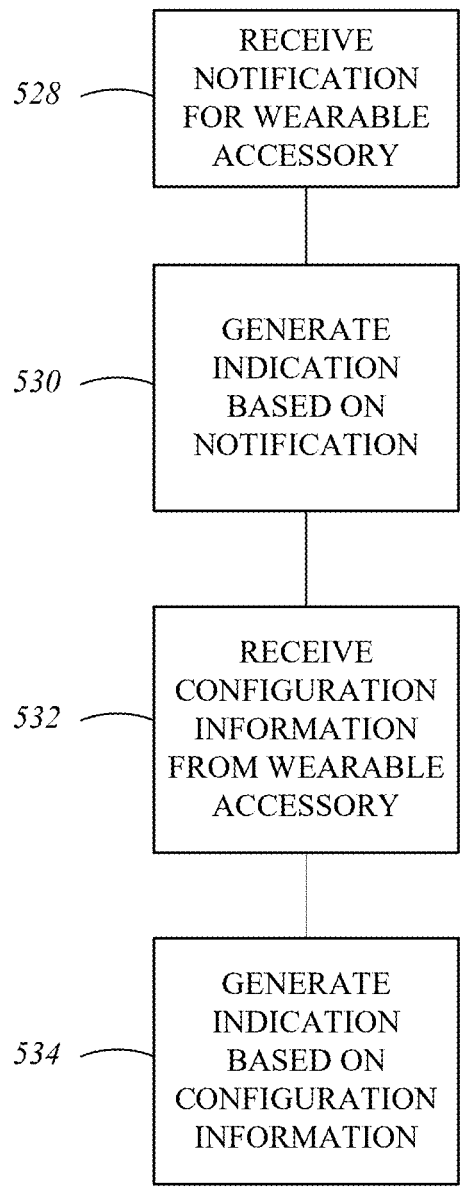
FIG. 5 is a flow chart describing a notification process for a hub station.

FIG. 5 is a flow chart describing a notification process for a hub station, for example, one of the hub stations 200, 300, 400 of FIGS. 2A to 4, related to wearable accessories such as the wearable accessories described with respect to FIG. 1. The wearable accessories include the power pack 102, the cord or cable 104, the input device 106, the first set and second of lenses 108, 114, the first and second face seals 110, 116, and the first and second set of temple arms 112, 118 suitable for use by at least first and second users, for example, with the HMD 100. Other wearable accessories (not shown), such as headbands, remote control units, etc., may also benefit from the process described with respect to FIG. 5.

The notification process includes a step 528 of receiving, by the hub station, a notification for a wearable accessory located at the hub station. The wearable accessory can be received on an accessory area of the hub station, such as disposed in a receptacle. The notification can be intended for an HMD usable with the wearable accessory, and the HMD can be spaced from the hub station and the wearable accessory such that the HMD is not currently able to display such a notification to the user intended to receive the notification. The notification can be indicative of an incoming call for one of the users of the HMD, of a firmware update for one of the wearable accessories, including for the HMD, or of an incoming message for one of the users of the HMD, such as a text or chat message. Other notifications are also possible.

The notification process includes a next step 530 of generating an indication, by a hub indicator of the hub station, based on the notification. The hub indicator, such as one of the hub indicators 210*a,b* of the hub station 200, the hub indicators 310*a,b,c,d,e* of the hub station 300, or the hub indicators 410*a,b,c,d,e,f,h1,h2* of the hub station 400, allows for wearable accessories to serve as conduits for notifications to specific users when multiple users share the HMD. For example, the hub indicator that generates the indication based on the notification can emit a predetermined color or pattern of light, can generate a sound, can display graphics or text, can show video or images, or can otherwise provide information or an alert that will notify a user proximate to the hub station, though not necessarily proximate to the HMD, that the H/ID is receiving a notification for such user, that is, for the specific user associated with the wearable accessory(ies) located at the hub station.

The notification process includes a next step 532 of receiving, by the hub station, configuration information that designates at least one of user information for, a charge level of, or an availability of the wearable accessory. This configuration information may be received by the hub station from one or more of the wearable accessories positioned at the hub station, such as from one of the electronics units 132, 134*a,b*, 136*a,b*, 142, 144, 150*a,b*, 152*a,b* described with respect to FIG. 1. This configuration information may be received from the HMD, for example, when the HMD sends information related to a firmware update to one or more of the wearable accessories through the hub station. The hub station may be able to execute such a firmware update without a need for the wearable accessory to be joined to the HMD. Other types and sources of configuration information are possible.

The notification process includes a next step 534 of generating another indication, by the hub indicator of the hub station, based on the configuration information. This indication may be different, in appearance or sound, than the indication generated by the hub indicator to denote the notification received. For example, the hub indicator can emit light of a certain color (e.g., green) or display a certain shape (e.g., a check mark) to indicate availability for use of one or more wearable accessories at the hub station. The hub indicator may emit light of a different color (e.g., red) or display a different shape (e.g., an X) to indicate lack of availability for use of one or more wearable accessories at the hub station. In another example, the hub indicator may show a battery icon with a predetermined fill amount to represent a percentage of charge of one or more wearable accessories at the hub station. In another example, the hub indicator may display text or a graphical representation, such as an avatar, to denote an association of a specific user with a wearable accessory. Other types of indications based on configuration information are possible.

Figure 6:
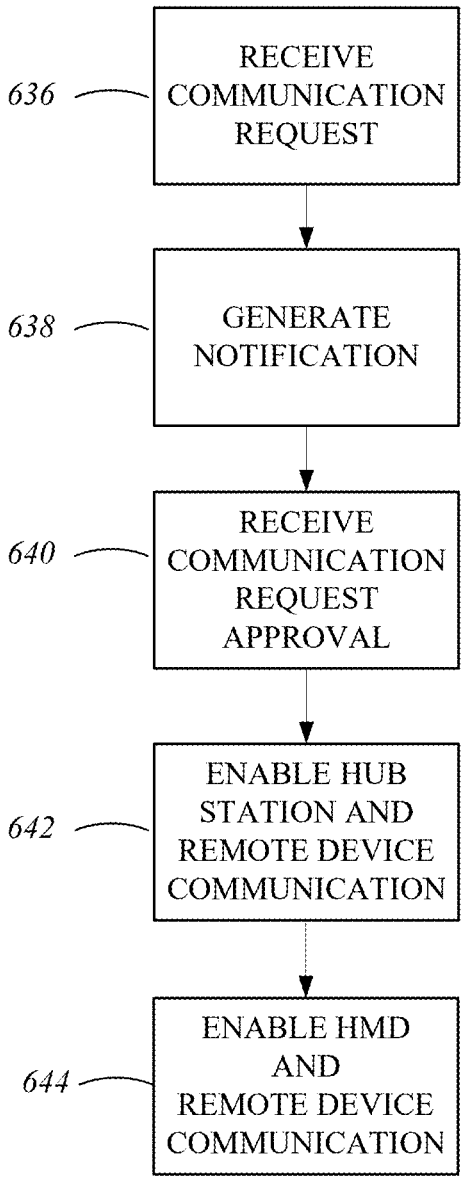
FIG. 6 is a flow chart describing another notification process for a hub station.

FIG. 6 is a flow chart describing another notification process for a hub station, for example, one of the hub stations 200, 300, 400 of FIGS. 2A to 4, related to wearable accessories such as the wearable accessories described with respect to FIG. 1. The wearable accessories include the power pack 102, the cord or cable 104, the input device 106, the first set and second of lenses 108, 114, the first and second face seals 110, 116, and the first and second set of temple arms 112, 118 suitable for use by at least first and second users, for example, with the HMD 100. Other wearable accessories (not shown), such as headbands, remote control units, etc., may also benefit from the process described with respect to FIG. 6.

The notification process includes a step 636 of receiving, by the hub station, a communication request for an HMD usable with a wearable accessory located at the hub station. The wearable accessory can be received on an accessory area of the hub station, such as disposed in a receptacle. The communication request can be intended for an HMD usable with the wearable accessory, and the HMD can be spaced from the hub station and the wearable accessory such that the HMD is not currently able to display such a communication request to the user intended to receive the communication request. The communication request can be indicative an incoming call for one of the users of the HMD or of an incoming message for one of the users of the HMD, such as a text or chat message. Other communication requests are also possible.

The notification process includes a next step 638 of generating, by the hub station, a notification based on the communication request. The notification can be audible, such as a sound generated by a speaker such as the speakers 320, 420 of the hub stations 300, 400. The notification can be visual, such a light generated by a light-guide indicator such as one of the light-guide indicators 426*a,b* of the hub station 400. For example, the light-guide indicator can emit a color or pattern of light that reflects within then refracts from a lens, such as from the sets of lenses 108, 114 of FIG. 1, to notify the relevant user that the user is receiving, for example, a call from an HMD associated with another user.

The notification process includes a next step 640 of receiving, by the hub station, approval information associated with the communication request for the UN/D usable with the wearable accessory. The approval information can be based on an input from a user to the hub station, such as a button press, a verbal affirmation, or a gesture. The approval information can be based on an input from a user to one of the wearable accessories at the hub station, such as a button press on a temple arm or a touch by the user on a pressure-sensitive light seal. The approval information can be based on an input from a user to the HMD or based on sensor information from the HMD, such as recognition of a user's face a present near a display of the HM/ID should the user pick up the HMD in response to the communication request. Other types of approval information are possible.

The notification process includes a next step 642 of enabling communication between the hub station and a remote device associated with the communication request. Once approval is received, the hub station can allow a user to communicate with a remote device, such as another UN/ID associated with another user. Depending on the features of the hub station, the communication between the users can be audible only, such as if the hub station includes a microphone and a speaker, or audible and visual, such as if the hub station includes a sensor with imaging capabilities and a display. The communication can be both in a physical environment, such as by capturing voice and image or video of a user proximate to the hub station, and in a virtual environment, such as if the remote device associated with the communication request is an HMD associated with another user that is currently operating in the virtual environment. This co-presence, physical and virtual, is useful to allow communication between users to be established even when, for example, both users are not present in the physical or virtual environment.

The notification process includes a next step 644 of enabling communication between the HMD and the remote device associated with the communication request based, for example, on receiving handoff information associated with the HMD. The handoff information can indicate that the user communicating through the hub station (e.g., as in step 642) is ready to communicate with the remote device (e.g., another HMD) through the HMD. This handoff information can be based on user input to the hub station or to the HMD, such as a button press, a gesture, or a verbal command. The handoff information can be generated automatically by the hub station, such as if a sensor of the hub station determines that the user has put on the HMD. This handoff information can be generated by the HMD, such as if a sensor of the HMD determines that the user has put on the HMD. Other sources of handoff information are possible.

Figure 7:
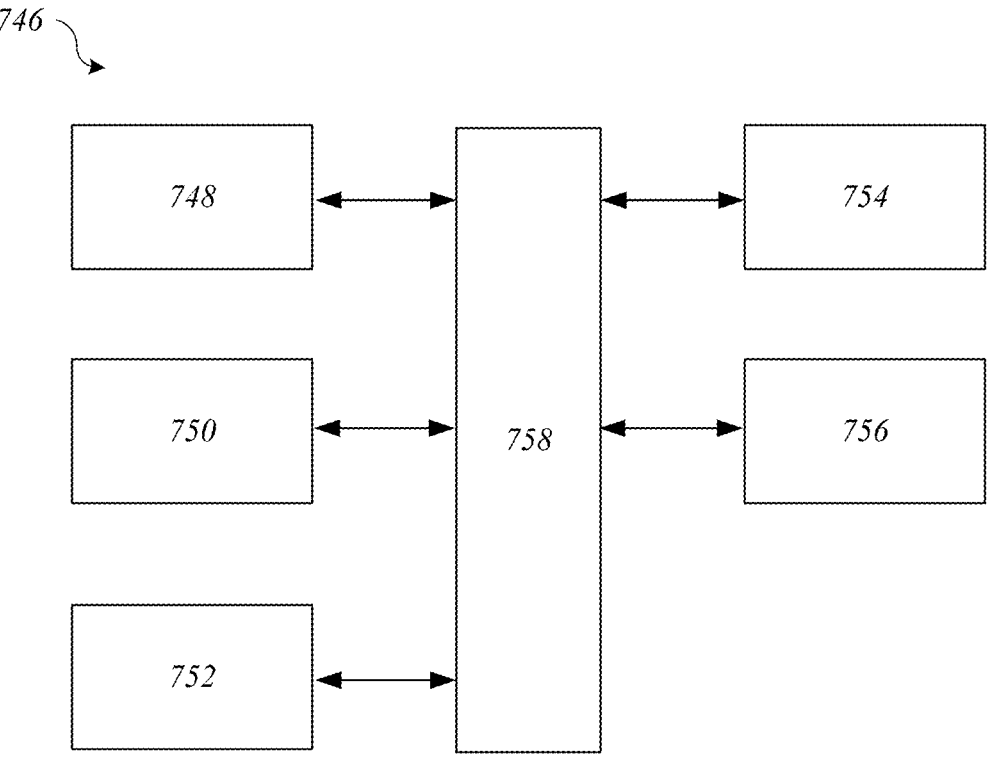
FIG. 7 is an illustration of a hardware configuration for a controller.

FIG. 7 shows an example of a hardware configuration for a controller 746 that may be used with the wearable accessories of FIG. 1 and the hub stations 200, 300, 400 of FIGS. 2A to 4. In the illustrated example, the controller 746 includes a processor 748, a memory device 750, a storage device 752, one or more input devices 754, and one or more output devices 756. These components may be interconnected by hardware such as a bus 758 that allows communication between the components.

The processor 748 may be a conventional device such as a central processing unit and is operable to execute computer program instructions and perform operations described by the computer program instructions. The memory device 750 may be a volatile, high-speed, short-term information storage device such as a random-access memory module. The storage device 752 may be a non-volatile information storage device such as a hard drive or a solid-state drive.

The input devices 754 may include sensors and/or any type of human-machine interface, such as buttons, switches, a keyboard, a mouse, a touchscreen input device, a gestural input device, or an audio input device. The output devices 756 may include any type of device operable to project audio, project images or video, or provide an indication or notification to a user of the hub stations 200, 300, 400 regarding notifications and configurations associated with wearable devices such as those described with respect to FIG. 1.

In reference to head-mounted displays such as the HMD 100, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from sensors or user profiles, to improve the function of systems such as the hub stations 200, 300, 400 of FIGS. 2A to 4. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of personal information data, in the present technology, can be used to the benefit of users. For example, the personal information data can be used to deliver changes to operational modes or configurations of systems such as the hub stations 200, 300, 400 to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of hub stations, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes or configurations associated with a hub station can be implemented for a given user by inferring user preferences or user status based on non-personal information data, a bare minimum amount of personal information, other non-personal information available to the systems, or publicly available information.

What is claimed is:

1. A hub station for a wearable accessory, comprising:
a receptacle configured to receive and support the wearable accessory;
a hub indicator associated with the receptacle; and
a processor configured to:
receive an indication from the wearable accessory designating at least one of user information for, a charge level of, or an availability of the wearable accessory;
when the wearable accessory is disposed in the receptacle, send instructions to activate the hub indicator based on the indication;
receive a notification from an external device for the wearable accessory; and
when the wearable accessory is disposed in the receptacle, send instructions to activate the hub indicator based on the notification.

2. The hub station of claim 1, wherein the hub indicator includes a first color, shape, or pattern associated with the indication and a second color, shape, or pattern associated with the notification.

3. The hub station of claim 1, wherein the hub indicator includes a display, wherein the display is configured to provide the indication designating the user information that includes a textual or pictorial representation of the user information.

4. The hub station of claim 1, wherein the hub indicator is configured to provide the indication designating the charge level of the wearable accessory using a first color, shape, or pattern.

5. The hub station of claim 4, wherein the hub indicator is configured to provide the indication designating the availability of the wearable accessory using a second color, shape, or pattern.

6. The hub station of claim 1, wherein the wearable accessory includes a wearable indicator, and wherein the processor is further configured to:
send instructions to activate the wearable indicator based on the notification.

7. The hub station of claim 1, wherein the notification for the wearable accessory is received from a head-mounted display that is usable with the wearable accessory and spaced from the hub station, and wherein the notification is received based on a communication request sent to the head-mounted display.

8. The hub station of claim 1, further comprising:
a locking mechanism having a locked position configured to secure the wearable accessory to the receptacle and an unlocked position configured to allow removal of the wearable accessory from the receptacle.

9. The hub station of claim 8, wherein the indication designating the availability of the wearable accessory is based on the position of the locking mechanism.

10. The hub station of claim 1, wherein the hub indicator is disposed on a surface of the hub station at a location adjacent to the receptacle.

11. A hub station, comprising:
a housing with accessory areas;
hub indicators disposed adjacent to and associated with at least some of the accessory areas, each hub indicator configured to provide a notification from an external device associated with a wearable accessory disposed on a respective accessory area; and
registration devices associated with at least some of the accessory areas, each registration device configured to orient a wearable accessory to a respective accessory area.

12. The hub station of claim 11, wherein the notification is representative of an incoming communication being received by a head-mounted display usable with a wearable accessory disposed on one of the accessory areas, and wherein the head-mounted display is spaced from the hub station.

13. The hub station of claim 12, wherein at least some of the hub indicators are configured to provide an indication designating at least one of user information for, a charge level of, or an availability of the wearable accessory disposed on the respective accessory area.

14. The hub station of claim 11, further comprising:
charging devices associated with at least some of the accessory areas,
each charging device configured to provide wireless charging to the wearable accessory disposed on the respective accessory area, and
each charging device including at least one of an inductive coil disposed within the housing, an electrical contact co-extensive with a surface of the housing, or a pogo pin configured for connection with the respective wearable accessory.

15. The hub station of claim 11, wherein one or more of the registration devices include magnets having predefined pole patterns configured to align or secure the wearable accessory with the respective accessory area.

16. The hub station of claim 11, wherein one or more of the registration devices include a locking mechanism having a locked position configured to secure a wearable accessory to a respective accessory area and an unlocked position configured to allow removal of the wearable accessory from the respective accessory area.

17. A hub station for wearable accessories, comprising:
accessory areas configured to receive and support the wearable accessories; and
hub indicators associated with respective accessory areas and located adjacent to the respective accessory areas,
wherein the hub indicators are configured to provide notifications from external devices associated with the wearable accessories when the wearable accessories are supported by the respective accessory areas, wherein the notifications are provided to respective ones of the hub indicators based on identification of a user of respective ones of the wearable accessories supported in respective accessory areas.

18. The hub station of claim 17, further comprising:

a display including a screen configured to show user information associated with a respective one of the wearable accessories when the respective one of the wearable accessories is supported by one of the accessory areas.

19. The hub station of claim 18, further comprising:

a microphone configured to receive speech from a user; and a speaker configured to emit sound, wherein the display, the microphone, and the speaker allow a user to interact with a notification received from a head-mounted display usable with the wearable accessories and spaced from the hub station.

20. The hub station of claim 17, wherein each of the hub indicators is disposed on a surface of the hub station at a location adjacent to a respective one of the accessory areas.

\* \* \* \* \*